United States Patent
Tornquist et al.

(10) Patent No.: US 6,750,572 B2
(45) Date of Patent: Jun. 15, 2004

(54) GENERATOR WITH IMPROVED LUBRICATION AND COOLING SYSTEM

(75) Inventors: Gerald Tornquist, Tucson, AZ (US); Kieran Doherty, Oro Valley, AZ (US); Jim Lengel, Oro Valley, AZ (US); Gregor McDowall, Tucson, AZ (US); Raymond Borden, Farmingdale, NJ (US)

(73) Assignee: Honeywell International, Inc., Morristown, NJ (US)

( * ) Notice: Subject to any disclaimer, the term of this patent is extended or adjusted under 35 U.S.C. 154(b) by 109 days.

(21) Appl. No.: 10/161,473

(22) Filed: Jun. 3, 2002

(65) Prior Publication Data

US 2003/0164651 A1 Sep. 4, 2003

Related U.S. Application Data

(60) Provisional application No. 60/361,249, filed on Mar. 1, 2002.

(51) Int. Cl.[7] .............................. H02K 9/00; H02K 9/09
(52) U.S. Cl. .............................. 310/54; 310/58; 310/59; 310/60 A
(58) Field of Search ........................ 310/52–54, 57–59, 310/60 A, 60 R

(56) References Cited

U.S. PATENT DOCUMENTS

| | | |
|---|---|---|
| 2,780,737 A | 2/1957 | Labastie et al. |
| 3,030,529 A | 4/1962 | Jaeschke et al. |
| 3,189,769 A | 6/1965 | Willyoung |
| 3,260,872 A | 7/1966 | Potter |
| 3,648,085 A | 3/1972 | Fujii |
| 3,800,174 A | 3/1974 | Butterfield et al. |
| 3,863,083 A * | 1/1975 | Jaeschke ............... 310/52 |
| 4,119,872 A | 10/1978 | Hunt |
| 4,203,044 A | 5/1980 | Linscott, Jr. |
| 4,262,224 A | 4/1981 | Kofink et al. |
| 4,621,210 A | 11/1986 | Krinickas, Jr. |
| 4,647,804 A | 3/1987 | Wefel |
| 4,959,570 A | 9/1990 | Nakamura et al. |
| 5,034,638 A * | 7/1991 | McCabria .............. 310/54 |
| 5,149,141 A * | 9/1992 | Newhouse ............. 285/13 |
| 5,160,864 A | 11/1992 | Saito |
| 5,181,837 A * | 1/1993 | Niemiec ............... 417/350 |
| 5,589,720 A | 12/1996 | Berger |
| 5,889,342 A | 3/1999 | Hasebe et al. |
| 5,898,245 A * | 4/1999 | Cochimin .............. 310/52 |
| 6,191,511 B1 * | 2/2001 | Zysset ................ 310/60 A |

FOREIGN PATENT DOCUMENTS

| | | |
|---|---|---|
| EP | 0 447 215 | 9/1991 |
| WO | WO 03/06090 | 7/2003 |

* cited by examiner

Primary Examiner—Tran Nguyen
(74) Attorney, Agent, or Firm—Robert Desmond, Esq.

(57) ABSTRACT

A lubricating and cooling system for a high speed generator that directs a lubricating and cooling medium through the generator housing. The lubricating and cooling medium may be supplied to the generator on either end of the housing. A portion of the medium is supplied to the generator bearings. The remaining portion then flows through the rotor shaft, through the rotor, back to the shaft, where a portion may be sprayed onto the rectifier assemblies, then passed through the stator, and out of the generator.

20 Claims, 6 Drawing Sheets

GENERATOR WITH IMPROVED LUBRICATION AND COOLING SYSTEM

CROSS-REFERENCE TO RELATED APPLICATION

This application claims the benefit of U.S. Provisional Application No. 60/361,249, filed Mar. 1, 2002.

FIELD OF THE INVENTION

The present invention relates to high speed generators and, more particularly, to high speed generators used with gas turbine engines such as those used in aircraft, tanks, ships, terrestrial vehicles, or other applications.

BACKGROUND OF THE INVENTION

A generator system for a gas turbine engine, such as that found in aircraft, may include three separate brushless generators, namely, a permanent magnet generator (PMG), an exciter, and a main generator. The PMG includes permanent magnets on its rotor. When the PMG rotates, AC currents are induced in stator windings of the PMG. These AC currents are typically fed to a regulator or a control device, which in turn outputs a DC current. This DC current next is provided to stator windings of the exciter. As the rotor of the exciter rotates, three phases of AC current are typically induced in the rotor windings. Rectifier circuits that rotate with the rotor of the exciter rectify this three-phase AC current, and the resulting DC currents are provided to the rotor windings of the main generator. Finally, as the rotor of the main generator rotates, three phases of AC current are typically induced in its stator, and this three-phase AC output can then be provided to a load such as, for example, an aircraft electrical system.

Some of the mechanical components within the generator rotate and thus may be supplied with lubricant. In addition, some of the electrical components within the generator may generate heat due to electrical losses, and thus may be supplied with a cooling medium. The lubricating and cooling media may be supplied from different systems, or from a single system that supplies a fluid, such as oil, that acts as both a lubricating and a cooling medium. In either case, the systems used to supply the lubricating and/or cooling media may not sufficiently lubricate and cool all of the rotating and electrical components within the generator housing. In addition, the flow of oil through the generator may result in some of the oil being preheated by some components before flowing to and through various other components. Moreover, the structure of the generator cooling system may not allow the generator to be connected to the lubricating and cooling system in alternate configurations.

Hence, there is a need in the art for a generator lubricating and cooling system that sufficiently lubricates and cools all of the rotating and electrical components within the generator housing, and/or does not significantly preheat the cooling medium, and/or allows the generator to be connected to the lubricating and cooling system in more than one configuration. The present invention addresses one or more of these needs.

SUMMARY OF THE INVENTION

The present invention provides an improved high speed generator with a lubricating and cooling oil system. In one embodiment of the present invention, and by way of example only, a high speed generator includes a housing, a rotor shaft, a rotor assembly, a stator assembly, a substantially hollow rotor shaft, at least one rotor cooling supply port, at least one rotor cooling return port, an oil supply conduit, at least one rotor assembly cooling flow path, an oil return conduit, and at least one stator cooling flow path. The rotor shaft is rotationally mounted within the housing. The rotor assembly is mounted on the shaft. The stator assembly is mounted within the housing and surrounds at least a portion of the rotor assembly. The substantially hollow rotor shaft is rotationally mounted within the generator housing, and has a first end, a second end, an outer circumferential surface, and an inner circumferential surface. The at least one rotor cooling supply port is positioned proximate the rotor shaft second end and extends between the rotor shaft inner circumferential surface and the rotor shaft outer circumferential surface. The at least one rotor cooling return port is positioned proximate the rotor shaft first end and extends between the rotor shaft inner circumferential surface and the rotor shaft outer circumferential surface. The oil supply conduit is coupled to the generator housing and has an inlet end in fluid communication with a pressurized oil source and an outlet end extending a first predetermined distance into the hollow rotor shaft. The at least one rotor assembly cooling flow path extends through the rotor, and has an inlet end in fluid communication with each rotor cooling supply port and an outlet end in fluid communication with each rotor cooling return port. The oil return conduit is coupled to the generator housing and surrounds at least a portion of the oil supply conduit, the oil return conduit has an inlet end extending a second predetermined distance into the hollow shaft and an outlet end in fluid communication with the rotor cooling return port. The at least one stator cooling flow path is positioned adjacent the stator and has an inlet in fluid communication with the oil return conduit second end and an outlet in fluid communication with a supply oil return path.

In another exemplary embodiment, an end bell for coupling to a high speed generator includes a housing, a first fluid inlet port, a second fluid inlet port, a first fluid outlet port, a second fluid outlet port, a substantially hollow oil supply conduit, a substantially hollow oil return conduit, a first flow path, and a second flow path. The supply conduit has an inlet end coupled to the housing and an outlet end extending a first predetermined distance from the housing. The oil return conduit surrounds at least a portion of the oil supply conduit and has an inlet end extending a second predetermined distance from the housing and an outlet end coupled to the housing. The first flow path extends through the housing and is in fluid communication between the first and second fluid inlet ports and the supply conduit inlet end. The second flow path extends through the housing and is in fluid communication between the first and second outlet ports and the return conduit outlet end.

In yet another exemplary embodiment, a high speed generator, includes a housing, a rotor shaft, a rotor assembly, and a stator assembly. The housing has at least two ends. The rotor shaft is rotationally mounted within the housing on at least two generator bearings. The rotor assembly is mounted on the shaft. The stator assembly is mounted within the housing and surrounding at least a portion of the rotor assembly. A path for fluid communication is provided to the generator on either end of the housing that directs a lubricating and cooling medium to the housing, and a portion of the lubricating and cooling medium is supplied to generator bearings, and a remaining portion then flows through the rotor shaft, through the rotor, back to the rotor shaft, through the stator, and out of the generator.

Other independent features and advantages of the preferred generator lubricating and cooling system will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that for convenience of explanation the present embodiment is described as being implemented in a four-pole generator. However, the present invention is not limited to use in a four-pole generator environment, but may be implemented in any one of numerous multi-pole generators including, without limitation, six-pole and two-pole generators.

Figure 1:
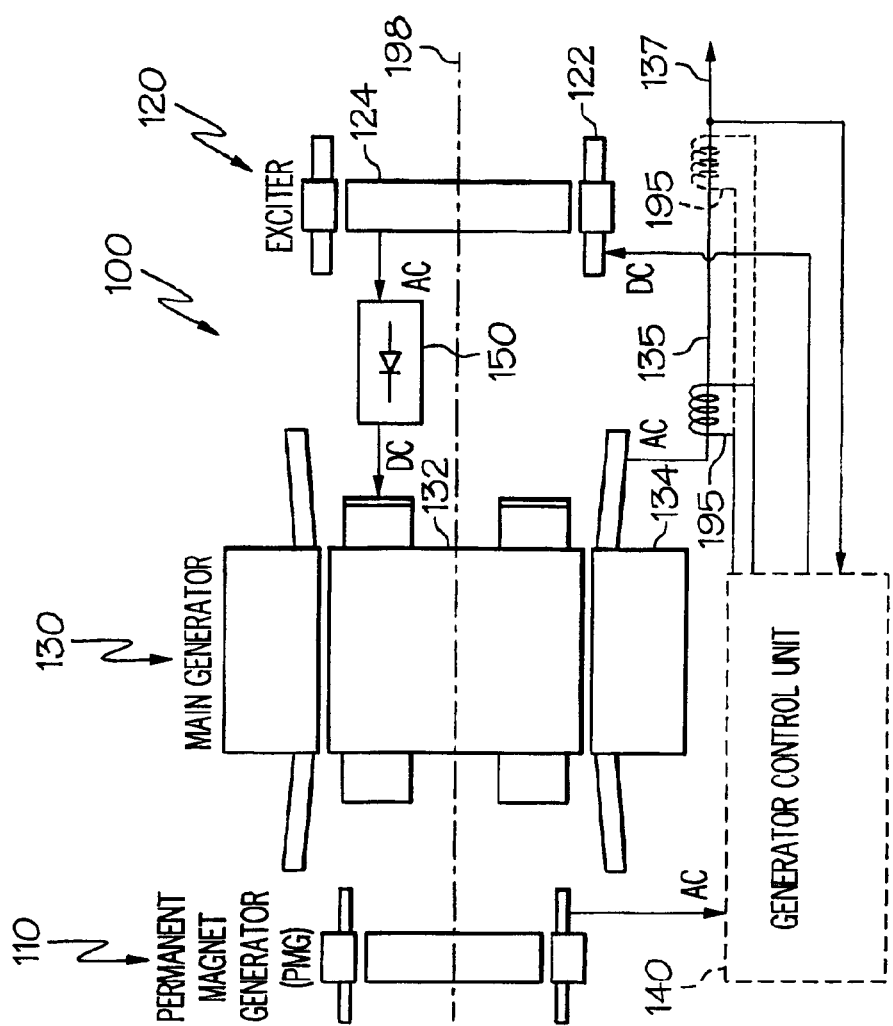
FIG. 1 is a functional schematic block diagram of an exemplary high speed generator system according to an embodiment of the invention.

Turning now to the description, and with reference first to FIG. 1, a functional schematic block diagram of an exemplary high speed generator system 100 for aircraft, and which may include an embodiment of the present invention, is depicted. This exemplary generator system 100, which is commonly known as a brushless AC generator, includes a permanent magnet generator (PMG) 110, an exciter 120, a main generator 130, a generator control unit 140, and one or more a rectifier assemblies 150. During operation, the PMG 110, exciter 120, and portions of the main generator 130 all rotate. As the PMG 110 rotates, it generates and supplies AC power to a generator control unit 140, which in turn supplies direct current (DC) power to a stator 122 of the exciter 120. A rotor 124 of the exciter 120 in turn supplies AC power to the rectifier assemblies 150. The output from the rectifier assemblies 150 is DC power and is supplied to a main generator rotor 132, which in turn outputs AC power from a main generator stator 134.

The generator system 100 is capable of providing output power at a variety of frequencies and over a variety of frequency ranges. The output power from the main generator stator 134 is typically three-phase AC power. One or more stator output leads 135 supplies the generated AC power to external systems and equipment via one or more terminal assemblies 137, which are discussed in more detail below. The generator control unit 140 can regulate the power output based upon monitoring signals provided to it from monitoring devices 195. In the depicted embodiment, the PMG 110, the exciter 120, and the main generator 130 all rotate along a single axis 198 at the same rotational speed. It will be appreciated, however, that in other embodiments the PMG 110 may rotate along a different axis. Moreover, the relative positioning of the PMG 110, the exciter 120, and the main generator 130 can be modified in different embodiments such that the exciter 120 is physically between the PMG 110 and the main generator 130. The generator system 100, or at least portions of the system 100, may be housed within a generator housing 202, a perspective view of which is illustrated in FIG. 2.

Figure 2:
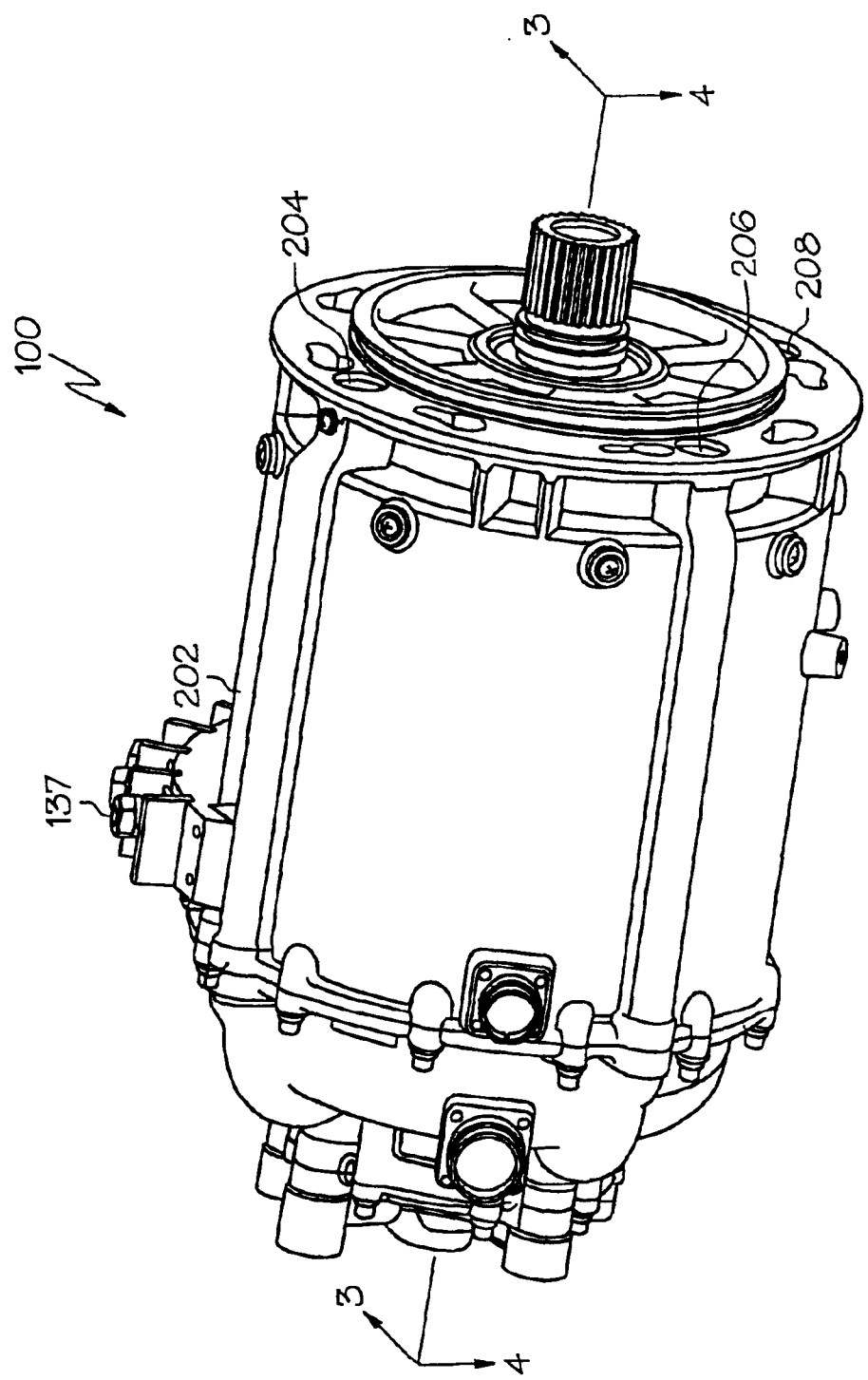
FIG. 2 is a perspective view of a physical embodiment of the generator system depicted in FIG. 1.
Figure 3:
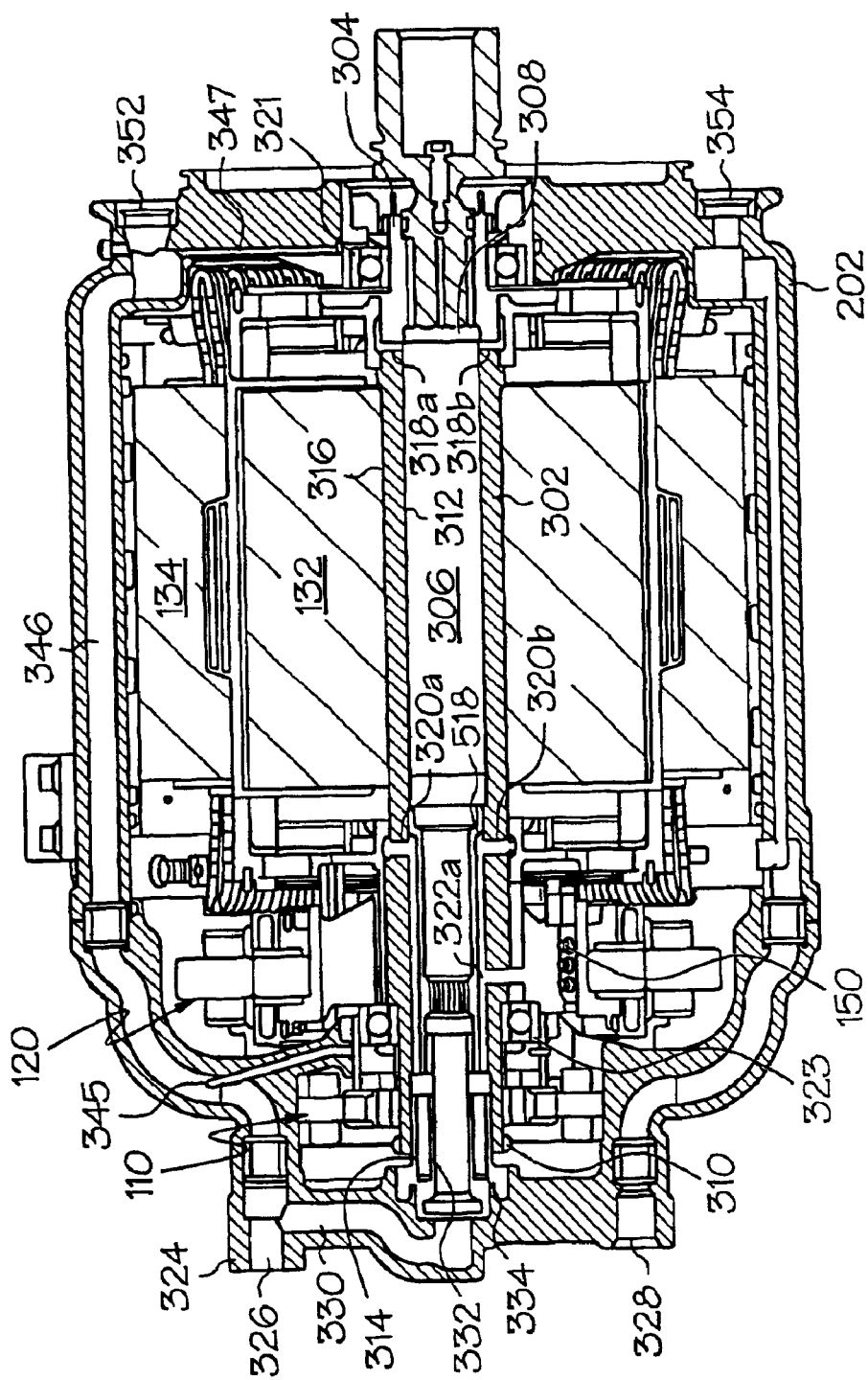
FIG. 3 is a cross section view of the generator taken along lines 3—3 in FIG. 2.
Figure 4:
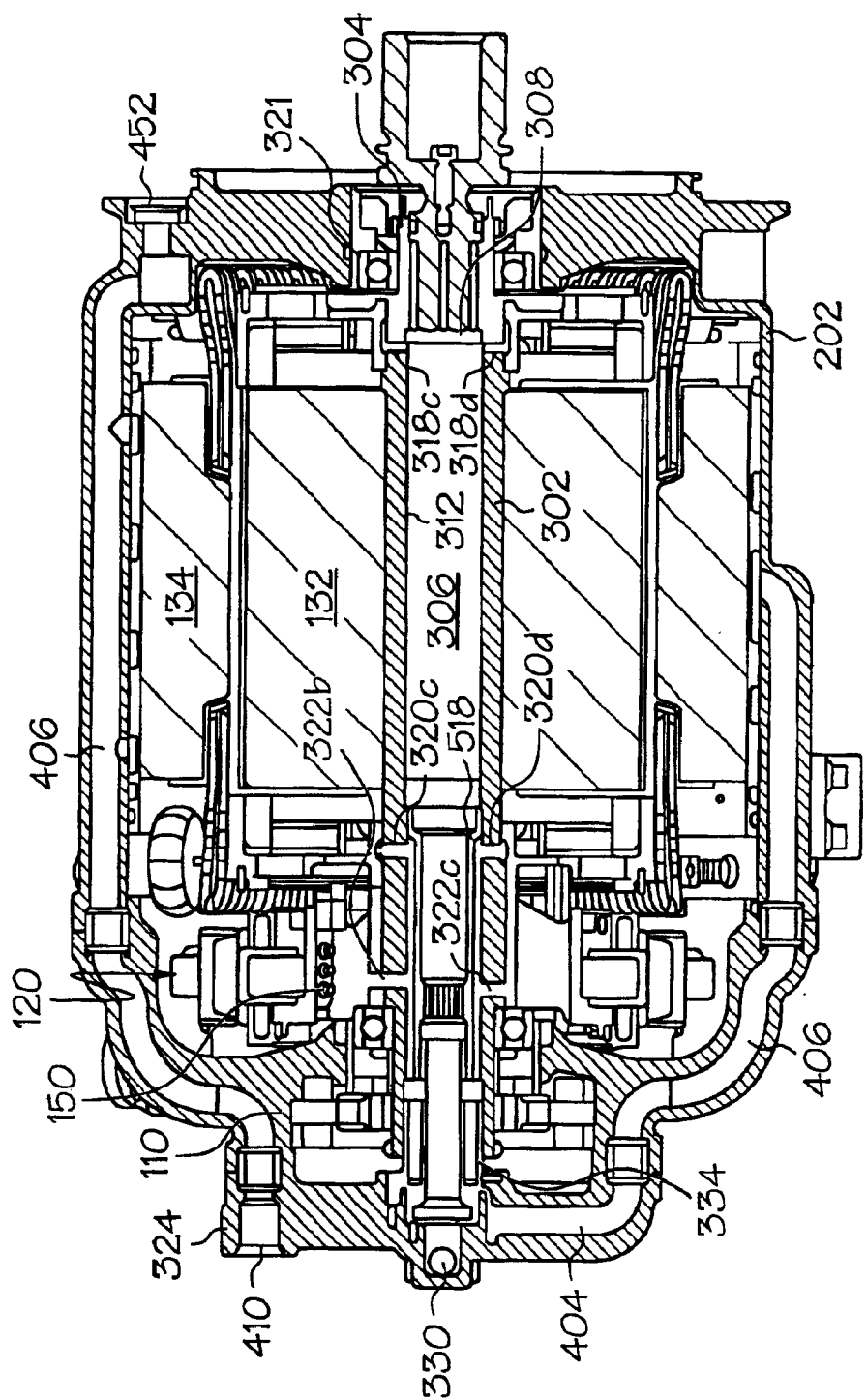
FIG. 4 is a cross section view of the generator taken along lines 4—4 in FIG. 2.

Turning now to FIGS. 3 and 4, which are cross section views taken through the generator housing 202 along lines 3—3 and 4—4, respectively, in FIG. 2, it is seen that the main generator rotor 132 is mounted on a rotor shaft 304, and is surrounded by the main generator stator 134. The rotor shaft 304 includes an axial bore 306 that extends between a first end 308 and a second end 310, forming an inner circumferential surface 312 in the rotor shaft 304. The rotor shaft first end 308 is closed and is adapted for coupling the rotor shaft 304 to a prime mover, such as, for example, a gas turbine jet engine (not shown), to rotate the rotor shaft 304. Thus, the first end 308 is sometimes referred to as the "drive end." The second end 310, which is sometimes referred to as the "anti-drive end," includes an inlet 314. As will be described further below, the rotor shaft inlet 314 receives cooling and lubricating oil from the oil source 204.

The rotor shaft 304 is rotationally mounted within the generator housing 202 by at least two bearing assemblies. A first bearing assembly 321 is mounted within the generator housing 202 near the rotor shaft drive end 308, and a second bearing assembly 323 is mounted within the generator housing 202 near the rotor shaft anti-drive end 310. As FIG. 3 further illustrates, the exciter 120 and the PMG 110 are both mounted on the rotor shaft 304. Thus, when the rotor shaft 304 is rotated, the exciter 120 and PMG 110 are simultaneously rotated. It should be appreciated that, although the exciter 120 and PMG 110 are depicted as both being mounted on the rotor anti-drive end 310, these components may be mounted on the rotor drive end 308, or one may be mounted on the rotor anti-drive end 310 while the other is mounted on the rotor drive end 308. The rectifier assemblies 150 are preferably mounted within the exciter 120. In the depicted embodiment, three rectifier assemblies 150 are mounted within the exciter 120, though only one rectifier assembly is shown. The rectifier assemblies 150 may be mounted in the exciter 120 in accordance with the system and method described in co-pending application Ser. No. 09/834,595 or other methods.

Orifices extend radially from the axial bore 306 between the inner circumferential surface 312 and an outer circumferential surface 316 of the rotor shaft 304. A set of rotor cooling supply orifices 318a–318d are located near the rotor shaft drive end 308 and, as will be described further below, are used to supply cooling and lubricating oil to the main generator rotor 132. Likewise, a set of rotor cooling return orifices 320a–320d are located near the rotor shaft anti-drive end 310 and are used to receive the lubricating and cooling oil returned from the main generator rotor 132. It will be appreciated that the number of rotor cooling supply and return orifices at each end of the rotor shaft 304 correspond to the number of poles and, thus, is not limited to four in number. A set of rectifier assembly cooling supply orifices 322a–322c are additionally located near the rotor shaft anti-drive end 310. The rectifier assembly cooling supply orifices 322a–322c are used to supply cooling oil to the rectifier assemblies 150. It will be appreciated that the number of rectifier assembly cooling supply orifices 322a–322c preferably corresponds to the number of rectifier assemblies 150 and, thus, is not limited to three in number.

Figure 5:
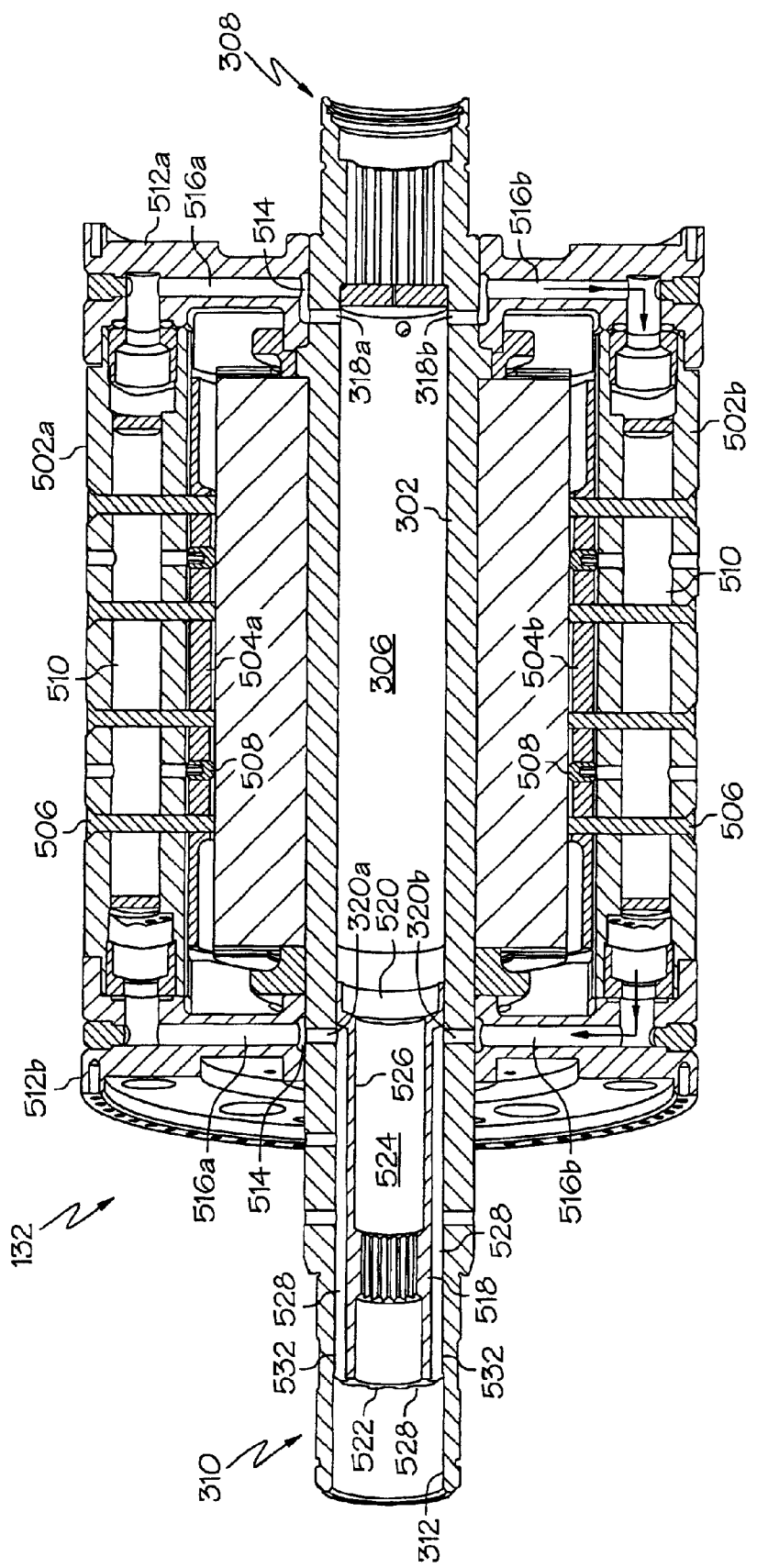
FIG. 5 is a cross section view of the generator rotor assembly illustrated in FIGS. 3 and 4.

With reference now to FIG. 5, a more detailed description of a preferred embodiment of the main generator rotor 132 will be provided in order to provide a better understanding of the preferred cooling path through the main generator rotor 132. As FIG. 5 illustrates, a support wedge system is installed in the interpole region between each of the main generator rotor poles Thus, in the depicted embodiment, four support wedge systems are installed. Though it will be appreciated that the present invention is not limited to any particular support wedge system configuration, the preferred support wedge system includes an outer support wedge and an inner support wedge. In particular, four outer support wedges 502a–502d (502c and 502d not visible) and four inner support wedges 504a–504d (504c and 504d not visible) are coupled together by attachment screws 506 and jack screws 508. The support wedges 502a–502d and 504a–504d may be mounted in the main generator rotor 132 by the system described and claimed in co-pending application Ser. No. 09/948,866 or by other methods. An axial channel 510 extends through each of the outer support wedges 502a–502d, which allows oil to flow in and through the outer support wedges 502a–502d to thereby cool the main generator rotor 132. Although no axial channels are shown within the inner support wedges, it is to be understood that in alternate embodiments these inner support wedges may also include at least one axial channel for circulating the cooling oil.

The outer support wedges 504a–504d are also restrained on the main generator rotor 132 by first and second end caps 512a, 512b. More particularly, the first end cap 512a is positioned around the rotor near the rotor shaft drive end 308 and the second end cap 512b is positioned around the rotor near the rotor shaft anti-drive end 310. The first and second end caps 512a, 512b each include an annulus 514 and four flow galleries 516a–516d (516c and 516d not visible). Each of the flow galleries 516a–516d is collocated with one of the orifices in the rotor shaft 304. More particularly, the four flow galleries 516a–516d in the first end cap 512a are each collocated with one of the rotor cooling supply orifices 318a–318d. Similarly, the four flow galleries 516a–516d in the second end cap 512b are each collocated with one of the rotor cooling return orifices 320a–320d. It will be appreciated that the number of flow galleries 516a–516d in each end cap 512a, 512b correspond to the number of poles, and is not limited to four.

A substantially hollow shaft insert 518 having a first end 520 and a second end 522 is interference fit within the rotor shaft bore 306, and thus rotates with the rotor shaft 302. The shaft insert 518 has an axial bore 524 that extends between the insert first end 520 and the insert second end 522, forming an inner circumferential surface 526 therein. A plurality of flow channels 528 are formed on an outer circumferential surface 530 of the shaft insert 518. These flow channels 528 extend from the insert second end 522 toward the insert first end 520 a predetermined distance beyond the rotor cooling return orifices 320a–320d. The flow channels 528 each define a flow space between the rotor shaft inner circumferential surface 312 and the shaft insert outer circumferential surface 526 through which cooling oil flows.

Returning once again to FIGS. 3 and 4, an end bell 324 is coupled to the generator housing 202. The end bell 324 includes a rotor oil supply passage 330 and a rotor oil return passage 404. The rotor oil supply passage 330 directs oil supplied to the generator housing 202 toward the rotor shaft bore 306. The rotor oil return passage 404 directs oil returned from the rotor shaft bore 306, out of the end bell 324 and into an oil discharge path 406, which is described in more detail below. Two substantially hollow conduits, an oil supply conduit 332 and an oil return conduit 334, are coupled to the end bell 324.

Figure 6:
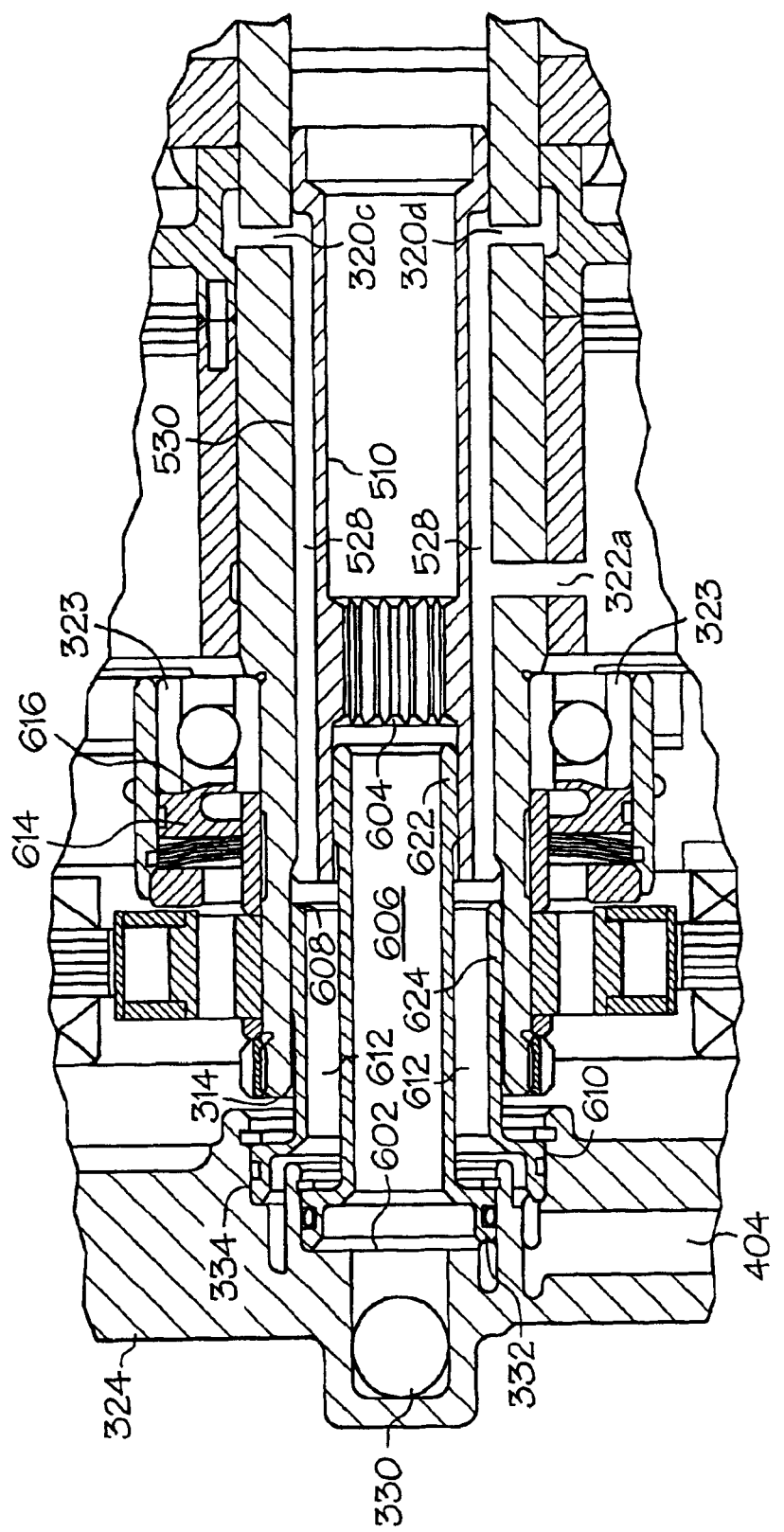
FIG. 6 is a close up cross section view of an end of the generator depicted in FIG. 2.

As shown more clearly in FIG. 6, which is a close-up cross section view of a portion of the end bell 324 and the rotor shaft anti-drive end 310, the oil supply conduit 332 has an inlet end 602 and an outlet end 604 coupled together by a flow passage 606. The oil supply conduit inlet end 602 is sealingly coupled to the end bell 324 and is in fluid communication with the rotor oil supply passage 330. The oil supply conduit outlet end 604 extends through the rotor shaft inlet 314, and into the shaft insert 518. Thus, oil supplied to the rotor oil supply passage 330 flows into and through the oil supply conduit flow passage 606, into and through the shaft insert 518, and into the rotor shaft bore 306. The oil supply conduit 332 may additionally include a first bushing 622 positioned proximate the outlet end 604. In the depicted embodiment, the first bushing 622 rests against the shaft insert 518. The first bushing 622 aids in maintaining proper alignment of the oil supply conduit 322 and restricts its radial movement.

The oil return conduit 334 is concentrically mounted around the oil supply conduit 332 and, similar to the oil supply conduit 332, includes both an inlet end 608 and an outlet end 610 coupled together by a flow passage 612. The oil return conduit outlet end 610 is sealingly coupled to the end bell 324 and is in fluid communication with the rotor oil return passage 404. The oil return conduit flow passage 612 surrounds the oil supply conduit 332. The oil return conduit inlet end 608 extends through the rotor shaft inlet 314, but does not extend into the shaft insert 510. Instead, the oil return conduit inlet end 608 is in fluid communication with the flow channels 528 formed on the shaft insert outer circumferential surface 530. Thus, as will be described more fully below, oil returning from the rotor 132 via the rotor cooling return orifices 320a–320d flows into and through the oil return conduit flow passage 612 and into the rotor oil return passage 404. Similar to the oil supply conduit 332 the oil return conduit 334 may additionally include a second bushing 624 positioned proximate its inlet end 608. In the depicted embodiment, the second bushing 624 rests against the rotor shaft inner circumferential surface 312. The second bushing 624, like the first bushing 622, aids in maintaining proper alignment of the oil return conduit 324 and restricts its radial movement.

Also depicted in FIG. 6 is a close up view of the second bearing assembly 323 and its surrounding structure. In particular, a bearing deflector 614 is positioned adjacent the second bearing assembly 323. The bearing deflector 614 includes an angled surface 616 that deflects oil supplied through a second bearing assembly oil supply passage 345 (see FIG. 3) onto the second bearing assembly 323. It should be appreciated that the first bearing assembly 321, though not similarly depicted, also has a bearing deflector 614 positioned adjacent to it for deflecting oil supplied through a first bearing assembly oil supply passage 343.

Cooling and lubricating oil may be supplied to and removed from the generator in one of two ways. First, the oil may be supplied to the generator via one or more oil inlet ports 352 formed in the housing 202 (see FIG. 3) and removed from the generator via one or more scavenge oil outlet ports 354 (see FIG. 3) and one or more oil outlet ports 452 (see FIG. 4) that are formed in the generator housing 202. The other way that oil may be supplied to and removed from the generator is via the end bell 324. In particular, similar to the generator housing 202, the end bell 324 includes one or more oil inlet ports 326, one or more scavenge oil ports 326 and one or more oil outlet ports 410. It should be appreciated that when oil is supplied to and removed from the generator via the ports formed in the housing 202, the ports in end bell 324 are plugged, and vice-versa.

Having described the generator 100 and the various flow paths through the generator housing 202 from a structural standpoint, a complete description of cooling and lubricating oil flow to, through, and out of the generator housing 202 will now be described. In doing so, reference should be made to FIGS. 3, 4, 5, and 6, as applicable. In addition, is should be noted that this description is based on the oil being supplied to, and removed from, the generator housing 202 using the oil supply ports 352, scavenge oil return ports 354, and oil return ports 452 ports formed in the generator housing 202. Oil flow to and from the generator when the ports in the end bell 324 are used will be readily apparent to the skilled artisan.

Referring first to FIG. 3, oil is supplied to the generator via the oil inlet ports 352. The oil enters the inlet ports 352 and flows through an oil supply passage 346 positioned adjacent the main generator stator 134. Oil flow through the supply passage 346 removes any heat generated in the stator 134. A portion of the oil in the supply passage 346 is directed toward the first and second bearing assemblies 321 and 323, via their respective oil supply passages 343 and 345. As described above, this oil is deflected by the bearing deflectors 614 onto the bearing assemblies 321 and 323 to provide lubrication.

The oil that does not flow to the bearings continues to flow through the supply passage toward the end bell 324, where it flows into and through the rotor oil supply passage 330. As can be seen more clearly in FIGS. 3 and 5, oil flows from the rotor oil supply passage 330 into and through the oil supply conduit 332, and then into and through the shaft insert 518. The oil that exits the shaft insert 518 flows through the rotor shaft axial bore 306 toward the rotor shaft drive end 308, and exits the rotor shaft 304 via the rotor cooling supply orifices 318a–318d. From the rotor cooling supply orifices 318a–318d, the oil flows through the flow galleries 516a–516d in the first end cap 512a, and into and through the axial channels 510 formed through each of the outer support wedges 502a–502d toward the second end cap 512b. The oil exiting the outer support wedges 502a–502d enters the flow galleries 516a formed in the second end cap 512b, and then flows into the rotor shaft 304 via the rotor cooling return orifices 320a–320b. It should be appreciated that the oil flowing through the outer support wedges 502a–502d cools the main generator rotor 132.

Turning now to FIGS. 4 and 6 in combination, the oil flowing through the rotor cooling return orifices 320a–320b enters the rotor shaft 304 and flows between the inner circumferential surface 312 of the rotor shaft 304 and the outer circumferential surface 530 of the shaft insert 518, via the flow channels 528 formed thereon. A portion of the oil flowing through the flow channels flows through the rectifier cooling assembly supply orifices 322a–322c and is sprayed onto the rectifier assemblies 150. The remaining oil then flows into and through the oil return conduit 334, and into the oil return passage 404 formed in the end bell 324. From the oil return passage 404, the oil flows into and through the oil discharge path 406, and out the oil outlet ports 452 formed in the generator housing 202. As with the oil flowing through the oil supply passage 346, the oil flowing through the oil discharge path 406 similarly removes heat that may be generated in the main generator stator 134.

It should additionally be noted that the oil flow paths through the generator housing are not leak tight. Moreover, as was described above, some of the oil is directed toward the first and second bearing assemblies 321 and 323, and some oil is sprayed onto the rectifier assemblies 150. As a result, a portion of the oil supplied to the generator housing 202 does not complete the circuit from the oil inlet ports 352 to the oil outlet ports 452. This oil, known as scavenge oil, is collected in the bottom of the generator housing 202 and, as shown more clearly in FIG. 3, is discharged via the scavenge oil outlet port 354.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A high speed generator, comprising:

a housing having at least two ends;

hollow rotor shaft rotationally mounted within the generator housing, the rotor shaft having a first end, a second end, an outer circumferential surface, and an inner circumferential surface;

a rotor assembly mounted on the rotor shaft;

a stator assembly mounted within the housing and surrounding at least a portion of the rotor assembly;

at least one rotor cooling supply port positioned proximate the rotor shaft second end and extending between the rotor shaft inner circumferential surface and the rotor shaft outer circumferential surface;

at least one rotor cooling return port positioned proximate the rotor shaft first end and extending between the rotor shaft inner circumferential surface and the rotor shaft outer circumferential surface;

an oil supply conduit coupled to the generator housing and having an inlet end in fluid communication with a pressurized oil source and an outlet end extending a first predetermined distance into the hollow rotor shaft;

at least one rotor assembly cooling flow path extending through the rotor, said at least one rotor cooling flow path having an inlet end in fluid communication with said at least one rotor cooling supply port and an outlet end in fluid communication with said at least one rotor cooling return port;

an oil return conduit coupled to the generator housing and surrounding at least a portion of the oil supply conduit, the oil return conduit having an inlet end extending a second predetermined distance into the hollow shaft and an outlet end in fluid communication with the rotor cooling return port; and at least one stator cooling flow path positioned adjacent the stator, said at least one stator cooling flow path having an inlet in fluid communication with second end of the oil conduit and an outlet in fluid communication with a supply oil return path.

2. The system of claim 1, further comprising:

a hollow shaft insert having an inner circumferential surface and an outer circumferential surface, the shaft insert concentrically mounted within the hollow rotor shaft to define a space between at least a portion of the rotor shaft inner circumferential surface and the shaft insert outer circumferential surface.

3. The system of claim 1, further comprising:
a diode cooling supply port extending between the rotor shaft inner circumferential surface and the rotor shaft outer circumferential surface; and
at least one rectifier diode assembly coupled within the generator housing proximate the diode cooling supply port.

4. The system of claim 1, further comprising:
at least one bearing assembly surrounding the rotor shaft; and
at least one bearing oil supply path extending between the stator cooling supply path and the bearing assembly.

5. The system of claim 4, further comprising: an oil deflector positioned within each bearing oil supply path proximate the bearing assembly.

6. The system of claim 1, wherein the oil supply conduit and the oil return conduit are coupled to an end bell that is coupled to the generator housing, and wherein the end bell comprises:
a first flow path in fluid communication between the pressurized oil source and the oil supply conduit first end; and
a second flow path in fluid communication between the oil return conduit second end and the stator cooling oil supply path.

7. The system of claim 1, wherein the rotor assembly is mounted on the rotor shaft and includes at least two poles, and wherein the rotor assembly cooling flow path comprises:
at least one support wedge positioned between each of the poles;
at least one axial channel formed through each support wedge, each axial channel having an inlet in fluid communication with at least one rotor cooling supply port, and an outlet in fluid communication with at least one rotor cooling return port.

8. They system of claim 7, further comprising:
a first end cap mounted on the rotor assembly proximate the first end thereof and including at least one first flow gallery extending between each rotor cooling supply port and the support wedge axial channels; and
a second end cap mounted on the rotor assembly proximate the second end thereof and including at least one second flow gallery extending between each rotor cooling return port and the support wedge axial channels.

9. A high speed generator, comprising:
a housing having at least two ends;
a hollow rotor shaft rotationally mounted within the generator housing, the rotor shaft having a first end, a second end, an outer circumferential surface, and an inner circumferential surface;
a rotor assembly mounted on the rotor shaft;
a stator assembly mounted within the housing and surrounding at least a portion of the rotor assembly;
at least one rotor cooling supply port positioned proximate the rotor shaft second end and extending between the rotor shaft inner circumferential surface and the rotor shaft outer circumferential surface;
at least one rotor cooling return port positioned proximate the rotor shaft first end and extending between the rotor shaft inner circumferential surface and the rotor shaft outer circumferential surface;
an oil supply conduit coupled to the generator housing and having an inlet end in fluid communication with a pressurized oil source and an outlet end extending a first predetermined distance into the hollow rotor shaft;
at least one rotor assembly cooling flow path extending through the rotor, said at least one rotor cooling flow path having an inlet end in fluid communication with said at least one rotor cooling supply port and an outlet end in fluid communication with said at least one rotor cooling return port;
an oil return conduit coupled to the generator housing and surrounding at least a portion of the oil supply conduit, the oil return conduit having an inlet end extending a second predetermined distance into the hollow shaft and an outlet end in fluid communication with the rotor cooling return port;
at least one stator cooling flow path positioned adjacent the stator, said at least one stator cooling flow path having an inlet in fluid communication with second end of the oil conduit and an outlet in fluid communication with a supply oil return path; and
a hollow shaft insert having an inner circumferential surface and an outer circumferential surface, the shaft insert concentrically mounted within the hollow rotor shaft to define a space between at least a portion of the rotor shaft inner circumferential surface and the shaft insert outer circumferential surface.

10. The system of claim 9, further comprising:
a diode cooling supply port extending between the rotor shaft inner circumferential surface and the rotor shaft outer circumferential surface; and
at least one rectifier diode assembly coupled within the generator housing proximate the diode cooling supply port.

11. The system of claim 9, further comprising:
at least one bearing assembly surrounding the rotor shaft; and
at least one bearing oil supply path extending between the stator cooling supply path and the bearing assembly.

12. The system of claim 11, further comprising:
an oil deflector positioned Within each bearing oil supply path proximate the bearing assembly.

13. The system of claim 9, wherein the oil supply conduit and the oil return conduit are coupled to an end bell that is coupled to the generator housing, and wherein the end bell comprises:
a first flow path in fluid communication between the pressurized oil source and the oil supply conduit first end; and
a second flow path in fluid communication between the oil return conduit second end and the stator cooling oil supply path.

14. The system of claim 9, wherein the rotor assembly is mounted on the rotor shaft and includes at least two poles, and wherein the rotor assembly cooling flow path comprises:
at least one support wedge positioned between each of the poles;
at least one axial channel formed through each support wedge, each axial channel having an inlet in fluid communication with at least one rotor cooling supply port, and an outlet in fluid communieation with at least one rotor cooling return port.

15. They system of claim 14, further comprising:
a first end cap mounted on the rotor assembly proximate the first end thereof and including at least one first flow gallery extending between each rotor cooling supply port and the support wedge axial channels; and
a second end cap mounted on the rotor assembly proximate the second end thereof and including at least one second flow gallery extending between each rotor cooling return port and the support wedge axial channels.

16. A high speed generator, comprising:

a housing having at least two ends;

a hollow rotor shaft rotationally mounted within the generator housing, the rotor shaft having a first end, a second end, an outer circumferential surface, and an inner circumferential surface;

a rotor assembly mounted on the rotor shaft;

a stator assembly mounted within the housing and surrounding at least a portion of the rotor assembly;

at least one rotor cooling supply port positioned proximate the rotor shaft second end and extending between the rotor shaft inner circumferential surface and the rotor shaft outer circumferential surface;

at least one rotor cooling return port positioned proximate the rotor shaft first end and extending between the rotor shaft inner circumferential surface and the rotor shaft outer circumferential surface;

an oil supply conduit coupled to the generator housing and having an inlet end in fluid communication with a pressurized oil source and an outlet end extending a first predetermined distance into the hollow rotor shaft;

at least one rotor assembly cooling flow path extending through the rotor, said at least one rotor cooling flow path having an inlet end in fluid communication with said at least one rotor cooling supply port and an outlet end in fluid communication with said at least one rotor cooling return port;

an oil return conduit coupled to the generator housing and surrounding at least a portion of the oil supply conduit, the oil return conduit having an inlet end extending a second predetermined distance into the hollow shaft and an outlet end in fluid communication with the rotor cooling return port;

at least one stator cooling flow path positioned adjacent the stator, said at least one stator cooling flow path having an inlet in fluid communication second end of the oil conduit and an outlet in fluid communication with a supply oil return path;

a hollow shaft insert having an inner circumferential surface and an outer circumferential surface, the shaft insert concentrically mounted within the hollow rotor shaft to define a space between at least a portion of the rotor shaft inner circumferential surface and the shaft insert outer circumferential surface;

a diode cooling supply port extending between the rotor shaft inner circumferential surface and the rotor shaft outer circumferential surface;

at least one rectifier diode assembly coupled within the generator housing proximate the diode cooling supply port;

at least one bearing assembly surrounding the rotor shaft;

at least one bearing oil supply path extending between the stator cooling supply path and the bearing assembly;

an oil deflector positioned within each bearing oil supply path proximate the bearing assembly.

17. The system of claim 16, wherein the oil supply conduit and the oil return conduit are coupled to an end bell that is coupled to the generator housing, and wherein the end bell comprises:

a first flow path in fluid communication between the pressurized oil source and the oil supply conduit first end; and a second flow path in fluid communication between the oil return conduit second end and the stator cooling oil supply path.

18. The system of claim 16, wherein the rotor assembly is mounted on the rotor shaft and includes at least two poles, and wherein the rotor assembly cooling flow path comprises:

at least one support wedge positioned between each of the poles;

at least one axial channel formed through each support wedge, each axial channel having an inlet in fluid communication with at least one rotor cooling supply port, and an outlet in fluid communication with at least one rotor cooling return port.

19. They system of claim 18, further comprising:

a first end cap mounted on the rotor assembly proximate the first end thereof and including at least one first flow gallery extending between each rotor cooling supply port and the support wedge axial channels; and a second end cap mounted on the rotor assembly proximate the second end thereof and including at least one second flow gallery extending between each rotor cooling return port and the support wedge axial channels.

20. An end bell for coupling to a high speed generator, comprising:

a housing;

a first fluid inlet port;

a second fluid inlet port;

a first fluid outlet port;

a second fluid outlet port;

a substantially hollow oil supply conduit having an inlet end coupled to the housing and an outlet end extending a first predetermined distance from the housing;

a substantially hollow oil return conduit surrounding at least a portion of the oil supply conduit, the oil return conduit having an inlet end extending a second predetermined distance from the housing and an outlet end coupled to the housing;

a first flow path extending through the housing and in fluid communication between the first and second fluid inlet ports and the supply conduit inlet end; and a second flow path extending through the housing and in fluid communication between the first and second outlet ports and the return conduit outlet end.

* * * * *